United States Patent
Wren

(10) Patent No.: US 7,861,743 B1
(45) Date of Patent: Jan. 4, 2011

(54) SACRIFICIAL CONDUIT LINING SYSTEM

(76) Inventor: Joseph J. Wren, 2620 Hawkeye Dr., Sioux City, IA (US) 51105

( * ) Notice: Subject to any disclaimer, the term of this patent is extended or adjusted under 35 U.S.C. 154(b) by 404 days.

(21) Appl. No.: 11/724,731

(22) Filed: Mar. 16, 2007

(51) Int. Cl.
 *F16L 55/16* (2006.01)
(52) U.S. Cl. .................. 138/98; 138/97; 405/150.1; 405/184.2
(58) Field of Classification Search .......... 138/97, 138/98; 405/150.1, 184.2
 See application file for complete search history.

(56) References Cited

U.S. PATENT DOCUMENTS

| | | | |
|---|---|---|---|
| 2,966,373 A * | 12/1960 | Yount | 285/213 |
| 3,228,096 A * | 1/1966 | Albro | 29/890.15 |
| 3,695,104 A | 10/1972 | Mannherz et al. | |
| 4,336,958 A * | 6/1982 | Goetzinger | 285/55 |
| 4,633,913 A * | 1/1987 | Carty et al. | 138/147 |
| 4,645,055 A * | 2/1987 | Griese et al. | 193/2 R |
| 4,714,095 A * | 12/1987 | Muller et al. | 138/98 |
| 4,733,889 A | 3/1988 | Haines | |
| 4,887,848 A | 12/1989 | Burba | |
| 4,985,196 A * | 1/1991 | LeDoux et al. | 264/516 |
| 5,044,670 A * | 9/1991 | Esser | 285/16 |
| 5,052,445 A * | 10/1991 | Berchem | 138/155 |
| 5,180,193 A * | 1/1993 | Rung et al. | 285/55 |
| 5,244,237 A * | 9/1993 | Harvey | 285/55 |
| 5,462,706 A * | 10/1995 | McMillan et al. | 264/138 |
| 6,123,109 A * | 9/2000 | Kamiyama et al. | 138/98 |
| 6,467,812 B1 | 10/2002 | Klemm et al. | |
| 6,701,965 B1 * | 3/2004 | Grace | 138/98 |
| 2006/0005893 A1 * | 1/2006 | Kaneta et al. | 138/98 |

\* cited by examiner

*Primary Examiner*—James F Hook
(74) *Attorney, Agent, or Firm*—Jeffrey A. Proehl; Woods, Fuller, Shultz & Smith, PC

(57) ABSTRACT

A sacrificial lining system for a conduit is disclosed and comprises a liner portion having a proximal end and a distal end, with the proximal end defining a proximal opening and the distal end defining a distal opening. The lining system further comprises a flange portion positioned at and being united to the proximal end of the liner portion. The flange portion surrounds the proximal opening. The distal end of the liner portion is free of any flange structure to permit the distal end to be freely insertable into and through the lumen of the conduit.

1 Claim, 6 Drawing Sheets

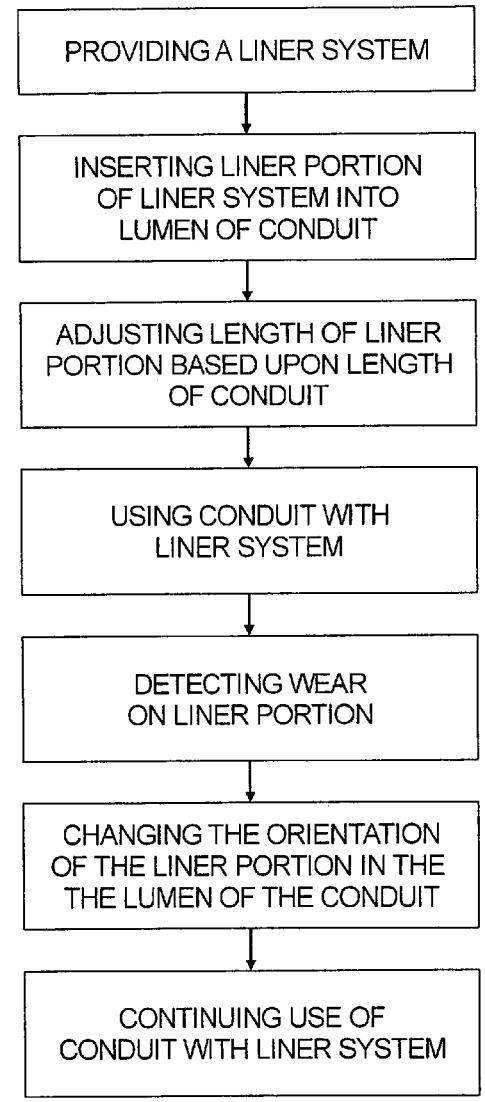

SACRIFICIAL CONDUIT LINING SYSTEM

BACKGROUND OF THE INVENTION

1. Field of the Invention

The present invention relates to pipe protecting systems and more particularly pertains to a new sacrificial conduit lining system for providing an easily installable and adaptable sacrificial liner that may be utilized in more than one orientation to provide a longer useful life.

2. Description of the Prior Art

Conduits, sometimes referred to as spouting, are used to convey materials between two locations, and often employ air flow to move the materials along the spouting when the material is, for example, a dry particulate material such as grain, sand, aggregate, and the like. Typically, the spouting that is used to convey the bulk particulate materials comprises sections of metal tubing in varying lengths that have flange rings attached at the each of the ends of each of the sections of spouting. To make a functioning spout, sections of the metal spout tube are bolted together using the flange rings. The spout is usually metal tubing with a round or circular cross section and may be made with various thicknesses and diameters. In some applications, the spouting is suspended at an angle (for example, at an angle of approximately 40 degrees or more) so that bulk materials slide down the inside of the spout.

Normally, the metal spout is not lined with any protection material and as the conveyed material moves or slides through the spout, it causes wear on the inner surface of the spouting and eventually may produce a hole in the tube. It has been known to line a spout with flat sheet made of ultra high molecular weight plastic or other similar material that is cut to size, rolled to the proper diameter, inserted into the tube and then bolted, glued or otherwise fastened in place inside the spout.

This type of approach to a liner has several inherent drawbacks. For example, installation of this liner in the spouting is tedious work and is also time consuming. Also, a seam is formed along the line where the edge portions of the cut sheet meet together, and there are seams between each cut piece that is inserted into the length of the spout, and these seams form points of weakness in the lining, and can even result in gaps in the protection provided to the spout if the edges are not carefully and completely abutted. This form of liner is also subject to the possibility of pulling loose from the fastening elements and then collapsing inside the spouting tube, which may cause plugging of the tube and result in blockage of the flow of the material through the spouting. Also, once one portion or section of the liner wears to a point where the protection may be compromised, the liner must be replaced and discarded regardless of the relative condition of the remainder of the liner.

Additionally, other liner structures have been proposed for piping, but often include flanged areas on opposite ends which result in a liner that has to be closely tailored to the size and length of a particular pipe, as the flanged areas limit the lengths of pipe that can be accommodated. Other pipe liners include features for T-shaped pipe configurations. Of course, there are lining structures that are formed in place and adhered to the wall of the pipe, but these are unsuitable for use with particulate materials that are abrasive and tend to quickly wear the lining (and pipe) materials.

The limitations and drawbacks of the known approaches to protectively lining a conduit are evidence of a need for a liner system that is sacrificial and easily replaceable, yet permits greater utilization of the sacrificial material before replacement is required. Another unmet need is the capability to utilize liners with a relatively few predetermined lengths on conduits having a relatively wide variety of lengths, without for example having to form the liner in place.

SUMMARY OF THE INVENTION

In view of the foregoing disadvantages inherent in the known types of pipe protecting systems now present in the prior art, the present invention provides a new sacrificial conduit lining system construction wherein the same can be utilized for providing an easily installable and adaptable sacrificial liner that may be utilized in more than one orientation to provide a longer useful life.

To attain this, one aspect of the present invention generally includes a lining system for a conduit, comprising a liner portion having a proximal end and a distal end, with the proximal end defining a proximal opening and the distal end defining a distal opening. The lining system further comprises a flange portion positioned at and being united to the proximal end of the liner portion. The flange portion surrounds the proximal opening. The distal end of the liner portion is free of any flange structure to permit the distal end to be freely insertable into and through the lumen of the conduit.

Another aspect of the invention involves a method of lining a lumen of a conduit with a sacrificial lining system, and comprises providing a liner system having a liner portion and a flange portion being positioned at and being united to a proximal end of the liner portion, and inserting a distal end of the liner portion into the lumen of the conduit. In one implementation, the method additionally includes detecting a degree of wear on an inner surface of the liner portion, and changing an orientation of the liner portion in the conduit to present a changed wear surface. In another implementation, the method additionally comprises adjusting a length of the liner portion to a length of the conduit while the liner portion is positioned in the lumen of the conduit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

A significant advantage of the present invention is the ability to use one length of liner system to be adapted to conduits of various lengths. Another significant advantage is the ability to reposition the lining system with respect to the conduit to permit multiple surface areas of the peripheral wall of the lining system to be used in a serial fashion to maximize the protective life of the liner portion.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein:

FIG. 6 is a diagrammatic flowchart of a method of lining a conduit with a lining system of the present invention.

DESCRIPTION OF PREFERRED EMBODIMENTS

Figure 1:
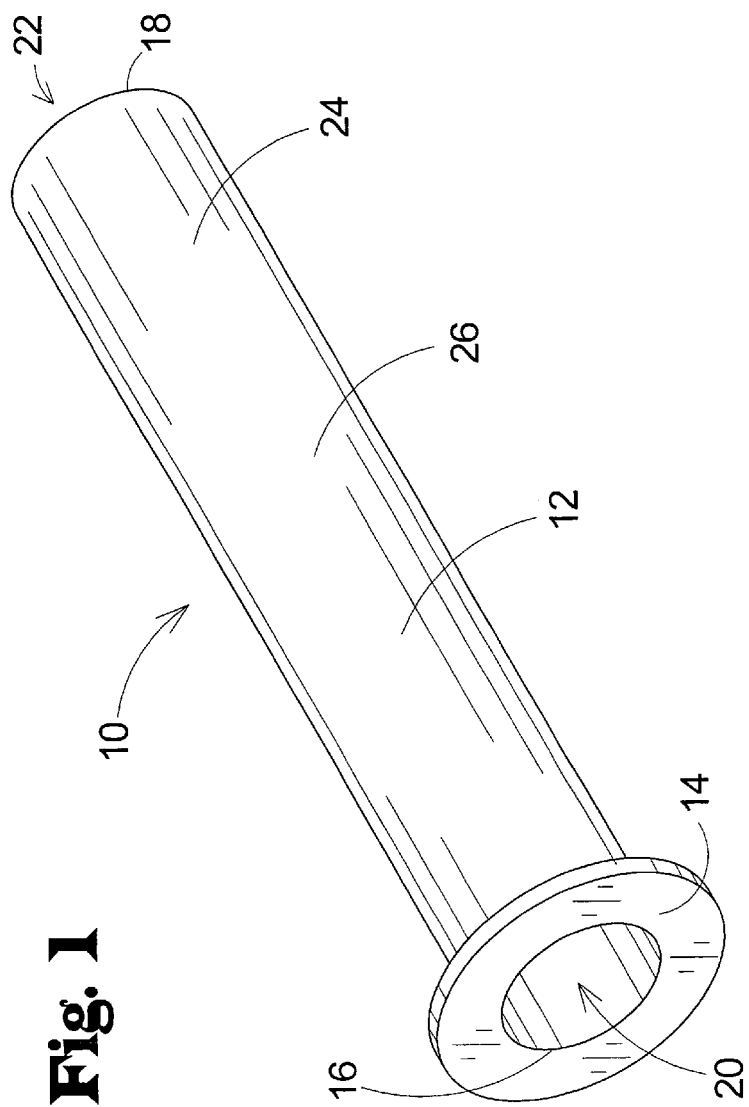
FIG. 1 is a schematic perspective view of a new sacrificial conduit lining system according to the present invention.
Figure 2:
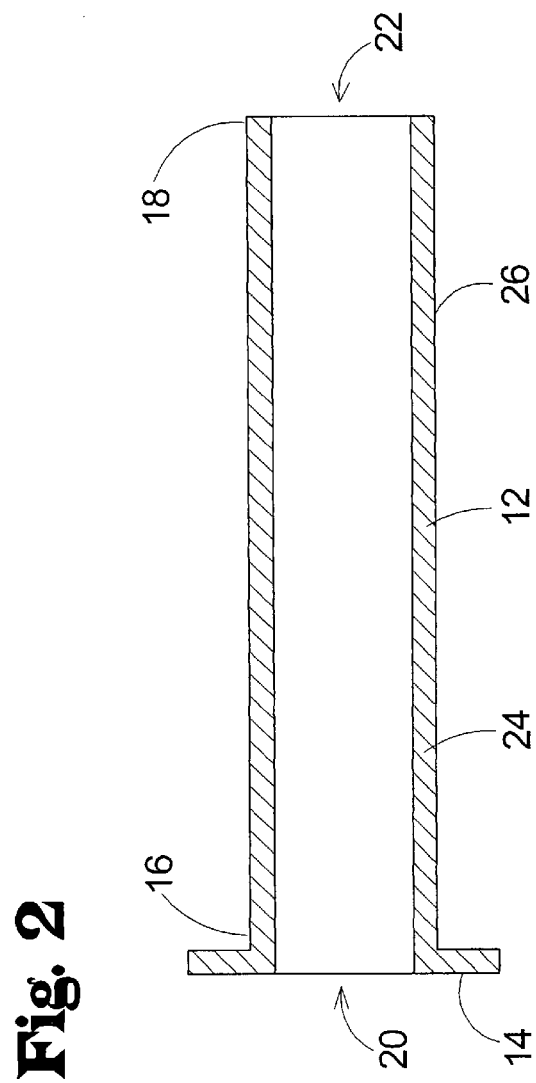
FIG. 2 is a schematic sectional view of the present invention particularly illustrating the liner portion and the flange portion.
Figure 3:
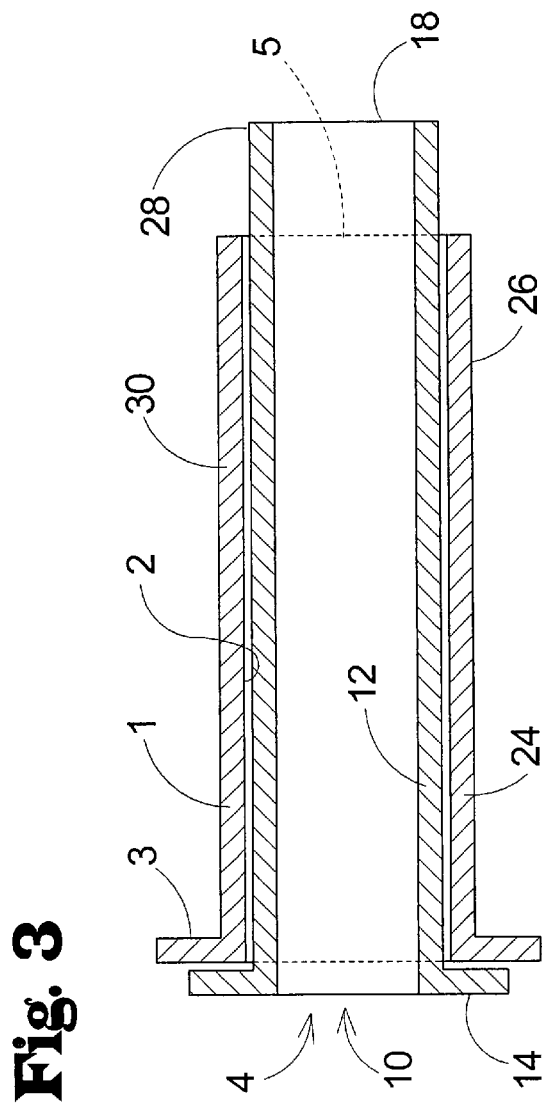
FIG. 3 is a schematic sectional view of the lining system of the present invention shown inserted into a conduit prior to adjusting the length of the lining system to the length of the conduit.
Figure 4:
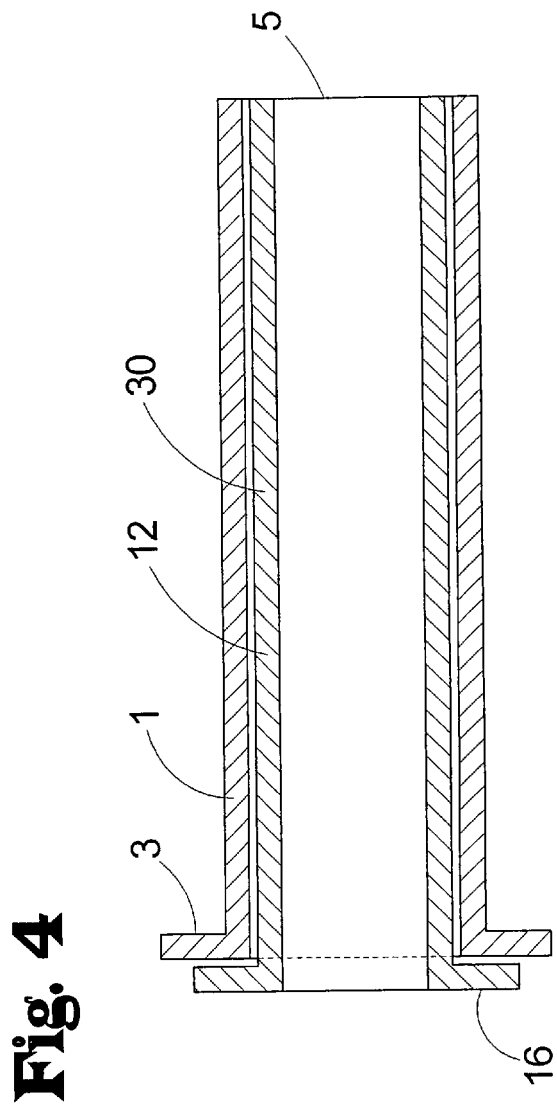
FIG. 4 is a schematic sectional view of the lining system of the present invention shown inserted into the conduit after adjusting the length to the length of the conduit.

With reference now to the drawings, and in particular to FIGS. 1 through 6 thereof, a new sacrificial conduit lining system embodying the principles and concepts of the present invention and generally designated by the reference numeral 10 will be described.

As best illustrated in FIGS. 1 through 6, the sacrificial conduit lining system 10 generally comprises a liner portion 12 for positioning in a lumen 2 of a conduit 1, and a flange portion 14 for positioning adjacent to a flange 3 of the conduit 1.

The liner portion 12 has a proximal end 16 and a distal end 18, with the proximal end defining a proximal opening 20 and the distal end defining a distal opening 22. The liner portion 12 may comprise a peripheral wall 24, which has an outer surface 26. The peripheral wall 24 may be substantially cylindrical in shape.

The flange portion 14 is positioned at the proximal end 16 of the liner portion 12, and the flange portion may surround the distal opening 22. The flange portion 14 extends outwardly with respect to the outer surface 26 of the peripheral wall 24. In some embodiments, the flange portion 14 and the liner portion 12 are inseparably united together, such as, for example, by bonding the portions 12, 14, during the forming or casting process of the liner portion.

Significantly, the distal end 18 of the liner portion 12 is free of any flange structure, such as a flange structure that extends outwardly from the outer surface 26 of the peripheral wall 24. Thus, the lining system 10 has a substantially uniform diameter from the proximal end 16 of the liner portion 12 to the distal end 18 and beyond. The flange portion 14 thus forms an enlarged section of the lining system 10 that is not able to insert into a conduit of suitable size for the lining system 10 into which the liner portion 12 is able to move.

In some embodiments of the invention, the liner portion 12 comprises a substantially rigid material that is able to maintain its shape inside the lumen 2 of a conduit 1, for example, without bonding to the inner surface of the lumen and without external supports. The liner portion 12 may comprise a cast urethane material, and may be seamless between the ends 16, 18.

In some embodiments, the flange portion 14 comprises a substantially rigid material, and may comprise a metal, although it is contemplated that any suitably rigid material may be used.

Figure 5:
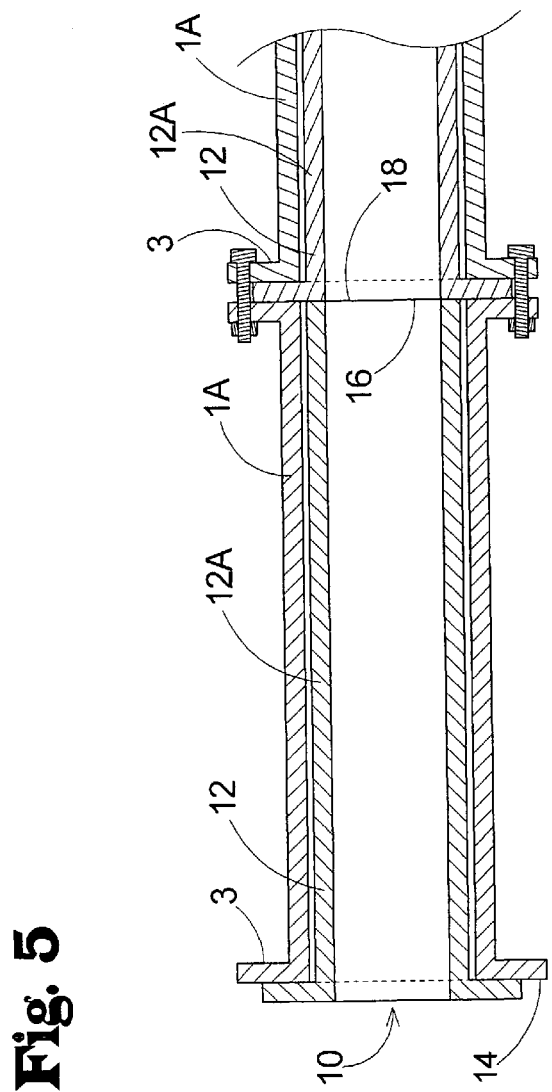
FIG. 5 is a schematic sectional view of the lining system of the present invention shown inserted on two connected conduits.

As shown in FIG. 5, the lining system 10 may be used in successively connected conduits 1 that are connected together. A first liner portion 12A may be inserted into a first conduit 1A, and any adjustments made to the length of the liner portion 12A, and a second liner portion 12B may be inserted into a second conduit 1B, and the first 1A and second 1B conduits may be connected together, such as, for example, by fasteners, and this may be accomplished without physically attaching the first liner portion 12A to the second liner portion 12B. This arrangement may be repeated for successive conduits that are connected together.

In another aspect of the invention, a method of lining a lumen 2 of a conduit 1 with a sacrificial lining system 10 will be disclosed. The method includes providing a liner system 10 including various features described more fully above. The method further comprises inserting the distal end 18 of the liner portion 12 into the lumen 2 of the conduit 1. This step may include inserting the liner portion 12 through the first end opening 4 of a first end of the conduit 1, and may include positioning the flange portion 14 against the flange 3 located at the first end of the conduit. The method may include passing the distal end 18 of the liner portion 12 through a second end opening 5 of a second end of the conduit 1 so that the liner portion extends past or protrudes from the second end of the conduit, and the distal end 18 of the liner portion 14 may be spaced from the second end of the conduit.

The method may further include adjusting a length of the liner portion 12. The adjustment of the length of the liner portion may be performed while the liner portion is situated in the lumen 2 of the conduit 1, and may include adjusting the length of the liner portion to the length of the conduit 1. The adjustment of the length of the liner portion 12 may include shortening the length of the liner portion, as well as making the length of the liner portion substantially equal to a length of the conduit 1. The adjustment of the length may include severing a distal end section 28 of the liner portion 12 from a proximal end section 30 of the liner portion, and may further include severing the liner portion 12 at a location adjacent to the second end of the conduit.

The method may further include detecting a degree of wear on an inner surface of the liner portion 12. This may include periodically inspecting the inner surface of the liner portion for an area or areas that exhibit a degree of wear that shows or suggests a vulnerability to the peripheral wall 24 wearing through.

In some implementations, if wear that compromises the protection provided by the liner is detected or anticipated, the method may further include changing an orientation of the liner portion 12 in the conduit 1 to present a changed wear surface to material moving through the conduit. This changing of the orientation may include rotating the liner portion 12 about a longitudinal axis, in which the longitudinal axis may be the central longitudinal axis of the liner portion, and the central longitudinal axis of the conduit 1. This aspect of the method may comprise causing the rotation of the liner portion 12 while the liner portion is positioned in the lumen 2 of the conduit 1, and may include rotating the liner portion 12 such that flow of a particulate material through the liner portion will contact a different area of the inner surface of the liner portion. For example, the liner portion 12 may be rotated from a first position to a second position that is approximately 90 degrees about the longitudinal axis from the first position. In another example, the liner portion 12 may be rotated from a first position to a second position that is approximately 180 degrees about the longitudinal axis. It is contemplated that other angles of rotation may be employed as well.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of lining a lumen of a conduit with a sacrificial lining system, comprising:
    providing a liner system having a liner portion including a perimeter wall continuous about a circumference of the liner portion, and a flange portion being positioned at and being continuously united to a proximal end of the liner portion, the distal end of the liner portion being free of any flange structure, the liner portion having an outer surface with a uniform diameter from the proximal end to the distal end of the liner portion, the liner portion having an inner surface with a uniform diameter from the proximal end to the distal end;
    inserting a distal end of the liner portion into the lumen of the conduit;
    detecting a degree of wear on an inner surface of the liner portion;
    changing an orientation of the liner portion in the conduit to present a changed wear surface; and
    adjusting a length of the liner portion to a length of the conduit while the liner portion is positioned in the lumen of the conduit;
    wherein changing the orientation includes rotating the liner portion about a longitudinal axis;
    wherein rotating the liner portion includes causing the rotation of the liner portion while the liner portion is positioned in the lumen of the conduit;
    wherein rotating the liner portion includes rotating the liner portion such that flow of a particulate material contacts a different area of an inner surface of the liner portion;
    wherein inserting the liner portion includes passing the distal end of the liner portion through a second end opening of a second end of the conduit so that the liner portion extends past the second end of the conduit;
    wherein adjusting the length includes shortening the length of the liner portion; and
    wherein adjusting the length includes severing a distal end section of the liner portion which protrudes out of a distal end of conduit from a proximal end section of the liner portion positioned in the lumen of the conduit.

* * * * *